United States Patent Office 3,700,656
Patented Oct. 24, 1972

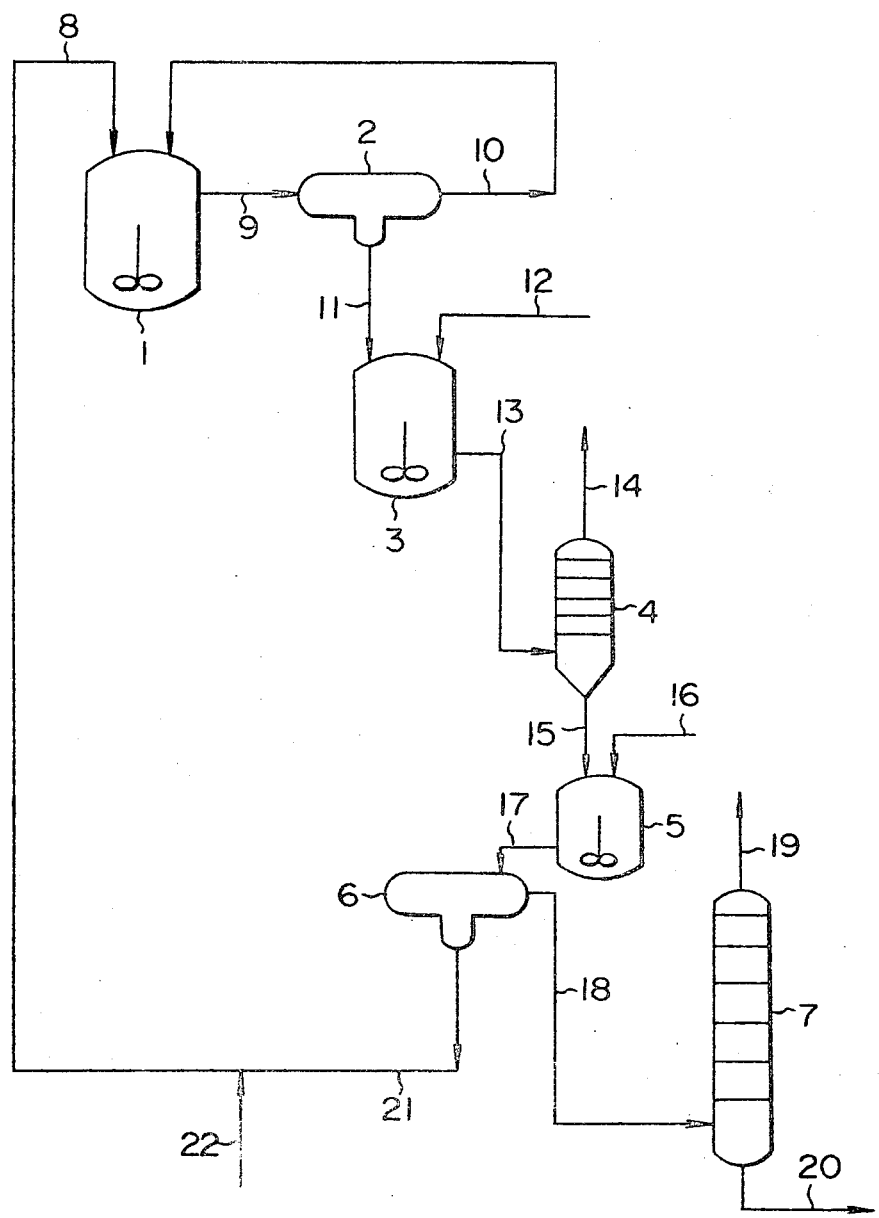

3,700,656
PROCESS FOR THE PREPARATION OF LACTAMS
Mitsuo Masaki, Chiba, and Kiyoshi Fukui, Tetsuro Kuramasu, and Masahiro Ueda, Ichihara, Japan, assignors to Ube Industries, Ltd., Yamaguchi-ken, Japan
Filed Aug. 25, 1970, Ser. No. 66,768
Claims priority, application Japan, Aug. 29, 1969, 44/67,957; Sept. 1, 1969, 44/68,631
Int. Cl. C07d 41/06
U.S. Cl. 260—239.3 A                8 Claims

ABSTRACT OF THE DISCLOSURE

A process for the preparation of lactams, which comprises treating a lactam-stannic halide complex with an alicyclic ketoxime to form the corresponding lactam and alicyclic ketoxime-stannic halide complex.

---

This invention relates to a novel process for the preparation of lactams. More particularly, the invention relates to a process for the preparation of lactams which comprises a novel reaction of lactam-stannic halide complexes with alicyclic ketoximes to form lactams and alicyclic ketoxime-stannic halide complexes, and also to a process for the preparation of lactams comprising a series of procedures for the preparation of lactams from alicyclic ketoximes, which include the above-described novel reaction.

Conventionally, lactams are normally prepared on industrial scales, by Beckmann rearrangement of corresponding alicyclic ketoximes in the presence of acid catalyst, such as sulfuric acid. However, in such practice the lactams are obtained as the addition salts of the acid employed. Consequently, the acid must be neutralized with base to recover free lactams, which results in the side-production of large quantities of salt of little value such as ammonium sulfate.

The object of the present invention is to provide a process for the preparation of valuable lactams only, with high yields, from alicyclic ketoximes, wherein the side production of large quantities of ammonium sulfate as seen in the conventional practice is effectively avoided. According to the subject process, either the side-production of ammonium sulfate is remarkably reduced, or is completely avoided.

We discovered that, when lactam-stannic halide complex is allowed to react with alicyclic ketoxime, the ketoxime releases the stannic halide from said complex to form free lactam, while the ketoxime itself is added with the stannic halide to form an alicyclic ketoxime-stannic halide complex, and also that the so-formed alicyclic ketoxime-stannic halide complex can be easily rearranged into lactam-stannic halide complex.

Thus the present invention relates to a process for the preparation of lactams, which comprises treating a lactam-stannic halide complex with an alicyclic ketoxime to form the lactam and the alicyclic ketoxime-stannic halide complex.

Furthermore, the invention relates to a process for the preparation of lactams from alicyclic ketoximes, which comprises treating lactam-stannic halide complex with alicyclic ketoximes to form lactams and alicyclic ketoxime-stannic halide complexes rearranging the alicyclic ketoxime-stannic halide complexes to lactam-stannic halide complexes in the presence of lactim-O-sulfonic acid; recycling the formed lactam-stannic halide complexes to the first step reaction; and recovering the lactams as the product.

As the alicyclic ketoximes used as the starting material in the subject invention; the oximes represented by the general formula

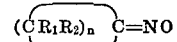
(I)

in which each of $R_1$ and $R_2$ stands for hydrogen, on alkyl group or alkenyl group, and
$n$ is a number of 3 to 11, are used.

Preferred alicyclic ketoximes are those of the Formula I in which both $R_1$ and $R_2$ are hydrogen atoms, such as cyclobutanone oxime, cyclopentanone oxime, cyclohexanone oxime, cycloheptanone oxime, cyclooctanone oxime, cyclononanone oxime, cyclodecanone oxime, cycloundecanone oxime, cyclododecanone oxime, etc.

Whereas, those ketoximes of Formula I in which either one of $R_1$ and $R_2$ or both are alkyl groups, preferably alkyl groups of up to 4 carbons such as methyl, ethyl, and propyl groups; or are alkenyl groups, preferably alkenyl groups of 2 to 4 carbons, such as vinyl and allyl groups, are also usable. Examples of such ketoxime include 4-methylcyclohexanone oxime, 4-ethylcyclohexanone oxime, 3-propylcyclopentanone oxime, 4-vinylcyclohexanone oxime, 3-propylcyclopentanone oxime, 4-vinylcyclohexanone oxime, and 4-allylcyclohexanone oxime.

As the lactam-stannic halide complexes, the complexes of lactams represented by the formula

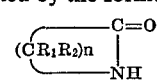
(II)

in which each of $R_1$ and $R_2$ is hydrogen, and an alkyl group or alkenyl group, and
$n$ is a number of 3–11.
with stannic halides are conveniently used.

As the lactams of above Formula II, those in which both $R_1$ and $R_2$ are hydrogen atoms, such as butyrolactam, valerolactam, caprolactam, enantholactam, caprylolactam, perlargonolactam, caprilactam, undecanolactam, laurolactam, etc. are especially preferred. Whereas, those lactams in which either one or both of $R_1$ and $R_2$ are alkyl groups, preferably alkyl groups of up to 4 carbons such as methyl, ethyl, and propyl groups; or are alkenyl groups, preferably alkenyl groups of 2 to 4 carbons such as vinyl and allyl groups, are also usable. Examples of such lactams include $\gamma$-methyllactam, $\gamma$-ethyllactam, $\beta$-propylvalerolactam, $\gamma$-propylvalerolactam, $\gamma$-vinylcaprolactam, $\gamma$-allylcaprolactam, etc.

As the stannic halide, stannic chloride is the most preferred, but it should be understood that other stannic halides, for example, stannic fluoride or bromide, may also be used.

The lactam-stannic halide complexes normally have the structure represented by the formula,

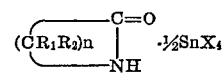
(III)

in which $R_1$, $R_2$, and $n$ have the above-defined significations, and
X is a halogen atom.

Examples of suitable complexes include butyrolactam-stannic bromide complex, alkyllactam-stannic chloride complex, valerolactam-stannic bromide complex, caprolactam-stannic chloride complex, caprolactam-stannic bromide complex, enantholactam-stannic chloride complex, caprylolactam-stannic chloride complex, pelargonolactam-stannic chloride complex, caprilactam-stannic chloride complex, undecanolactam-stannic chloride complex, laurolactam-stannic chloride complex, laurolactam-stannic bromide complex, alkyllactam-stannic chloride complex, alkyllactam-stannic bromide complex, and vinyllactam-stannic chloride complex, etc.

The novel reaction of the invention can be represented by the following reaction formula:

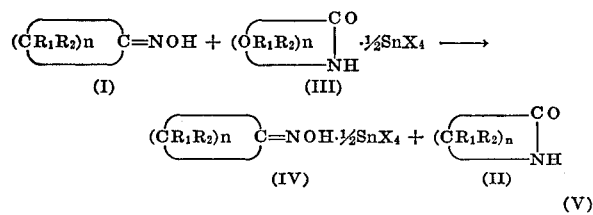

When the lactam-stannic halide complexes (III) are alicyclic ketoximes (I) are allowed to react as shown in the reaction Formula V, lactam (II) and alicyclic ketoxime-stannic halide complexes (IV) are formed. In the reaction, it is preferred that $R_1$ and $R_2$ in the above formulae of reactants, i.e., lactam-stannic halide complex and alicyclic ketoxime, are identical, respectively.

The reaction readily proceeds upon contacting the reactants under substantially anhydrous conditions, optionally in the presence of an inert, organic solvent. The reaction temperature is not critical. The reaction proceeds at temperatures ranging from room temperature (20° C.) to 150° C.

Useful solvents include, for example, halogenated hydrocarbons such as methylene chloride, ethylene chloride, ethylene bromide, chloroform, or carbon tetrachloride; aromatic hydrocarbons such as benzene, toluene, or xylene; esters such as ethyl acetate; and cyclic ethers such as dioxane or tetrahydrofuran.

When such a solvent is used, the reaction is conveniently preformed at boiling point of the solvent. For example, when a temperature of 60–100° C. is employed, an equilibrium is reached within approximately 10–30 minutes.

If no solvent is employed, it is preferred that the reaction is performed at a temperature in the vicinity of the melting point of the alicyclic ketoxime employed, maintaining the ketoxime in the molten state.

The reaction is an equimolar reaction. Therefore preferably the alicyclic ketoxime and lactam-stannic halide complex are allowed to react in substantially equimolar quantities. In that case the reactivity of single run ranges approximately 70–80%. Of course, the reaction may be carried out by using the reactants at mol ratios slightly deviated from the equimolar ratio, such as 1:0.2–1:5.

The reaction products are the lactam (II) corresponding to those in the lactam-stannic halide complex, and the complex (IV) of the used alicyclic ketoxime with the stannic halide. The latter complex (IV) is in the form that ½ mol of the stannic halide per mol of the alicyclic ketoxime is added to said ketoxime, which has not yet been disclosed in literatures.

When the reaction reaches an equilibrium condition, the lactam and alicyclic ketoxime-stannic halide complex are separated by optional means.

For example, when the reaction medium is a solvent which dissolves lactam and alicyclic ketoxime but does not dissolve the stannic halide complexes, such as benzene, the reaction mixture consists of the solution phase containing the lactam and alicyclic ketoxime at the mol ratio ranging approximately from 7:3 to 8:2, and a solid mixture of the alicyclic ketoxime-stannic halide complex and lactam-stannic halide complex at the mol ratio of approximately 7:3 to 8:2. Therefore the two can be separated by optional solid-liquid separation means.

When the reaction is performed at molten state, the reaction mixture is directly added to a solvent, which dissolves lactam and alicyclic ketoxime but does not dissolve stannic halide complexes thereof, such as benzene, ethyl ether, isopropyl ether, and n-hexane, to separate the solution phase containing the lactam and ketoxime from the solid phase containing the stannic halide complexes thereof. Whereas, when a solvent such as ethylene chloride is employed so that the reaction mixture is obtained as a homogeneous solution, first the solvent is distilled off from the reaction mixture, and the remaining semi-solid or solid reaction mixture can be added to a solvent as above.

The alicyclic ketoxime and lactam can be separated from the solution phase by the means known per se. In certain cases the two are not separated, but further the lactam-stannic halide complex is added to the solution to repeat the so far described reaction, to produce lactam of still higher purity.

Also by repeating the reaction under addition of alicyclic ketoximes to the mixture of the complexes, pure alicyclic ketoxime-stannic halide complex can be obtained.

According to the present invention, the oxime complex of the formula,

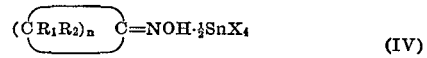

in which $R_1$, $R_2$, $n$ and $X$ have the above-defined significations which is formed together with lactams, can be readily rearranged into the lactam-stannic halide complex of the foregoing Formula III.

To wit, in one of the preferred embodiments of the present invention, the oxime complex of Formula IV is rearranged into the lactam-stannic halide complex of Formula III in the presence of lactim-O-sulfonic acid, and the formed lactam-stannic halide complex is recycled to the above-described initial step.

The lactim-O-sulfonic acid used in such an embodiment can be represented by the formula

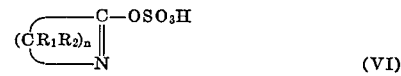

in which $n$ is a number of 3 to 11, and each of $R_1$ and $R_2$ is hydrogen, an alkyl group or alkenyl group.

Among such lactim-O-sulfonic acids, those of which $R_1$ and $R_2$ are both hydrogen atoms can be suitably employed in accordance with the present invention. Examples of such acids include butyrolactim-O-sulfonic acid, valerolactim-O-sulfonic acid, caprolactim-O-sulfonic acid, enantholactim-O-sulfonic acid, caprylolactim-O-sulfonic acid, pelargonolactim-O-sulfonic acid, caprilactim-O-sulfonic acid, undecanolactim-O-sulfonic acid, and laurolactim-O-sulfonic acid.

In the invention also those lactim-O-sulfonic acids in which either one or both of $R_1$ and $R_2$ are alkyl groups, preferably alkyl groups of up to 4 carbons such as methyl and ethyl; or are alkenyl groups, preferably the alkenyl groups of 2 to 4 carbons such as vinyl and allyl, are useful. Examples of such lactim-O-sulfonic acids include γ-methyl-caprolactim - O - sulfonic acid, γ-ethylcaprolactim-O-sulfonic acid, β-propylvalerolactim-O-sulfonic acid, γ-propylvolerolactim-O-sulfonic acid, γ-vinylcaprolactim-O-sulfonic acid, and γ-allylcaprolactim-O-sulfonic acid.

According to this embodiment, the alicyclic ketoxime-stannic halide complex obtained through the first step is added to the reaction medium containing the lactim-O-sulfonic acid. Whereupon the alicyclic ketoxime-stannic halide complex readily reacts with lactim-O-sulfonic acids, and is sulfonated to be converted to alicyclic ketoxime-O-sulfonic acid. Whereas, the lactim-O-sulfonic acid is converted to lactam-stannic halide complex. And, in the identical reaction system, the alicyclic ketoxime-O-sulfonic acids are immediately rearranged into lactim-O-sulfonic acids, to repetitively participate in the above-described reaction.

Namely, this novel reaction proposed by the invention can be generally represented by the reaction formula below.

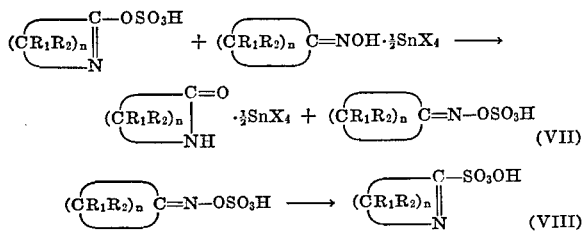

(VII)

(VIII)

Thus ultimately the alicyclic ketoxime-stannic halide complex added to the reaction system is substantially completely rearranged into lactam-stannic halide complex. Therefore, it is preferred that the $R_1$ and $R_2$ in the general formula of the lactim-O-sulfonic acid and alicyclic ketoxime-stannic halide complex to be allowed to react should be identical, respectively.

The reaction of above Formula VII is conveniently performed under substantially anhydrous condition, and in the presence of inert organic solvent. Suitable examples of useful inert solvent include halogenated hydrocarbons such as methylene chloride, ethylene chloride, ethylene bromide, chloroform, and carbon tetrachloride; and hydrocarbons such as toluene, xylene, benzene, and cyclohexane. The useful solvent however is not limited to the above-named, but other organic solvents can be used as far as they are inert to the lactim-O-sulfonic acids.

It is important that the lactim-O-sulfonic acids and the alicyclic ketoxime-stannic halide complex should be intimately contacted. When the contact of the two is satisfactorily effected, the reaction proceeds quantitatively.

The reaction temperature is not critical, but normally the temperatures ranging from 20° C. to 100° C. are suitably employed. Under such temperature condition, substantially all the alicyclic ketoxime complex can be rearranged into the corresponding lactam complex. In order to inhibit side reactions and to perform the intended reaction with high efficiency it is desirable to add ketoxime complex to the reaction system in an amount such that the reaction system contains not more than 500 mol percent, particularly not more than 100 mol percent based on the lactim-O-sulfonic acid present in the reaction system, of alicyclic ketoxime-stannic halide complex. Accordingly, it is advantageous that the alicyclic ketoxime complex is either incrementally or continuously added in portions to the system, so as to control the quantity of alicyclic ketoxime complex in the system 500 mol percent or below, preferably 100 mol percent or below, based on the lactim-O-sulfonic acid in the system. Thus it is made possible to rearrange continuously large amounts of alicyclic ketoxime complex to lactam complex, simply by making a predetermined quantity of lactim-O-sulfonic acid present in the reaction system at the initiation of the reaction.

It is also advantageous to promote rearrangement of the formed alicyclic ketoxime-O-sulfonic acid to lactim-O-sulfonic acid. For this purpose, stannic halides, or other halides, which are Lewis acids, may be caused to be present in the reaction system, if necessary in the form of a complex with an ether, in an amount up to the amount equimolar to the initially present lactim-O-sulfonic acid.

As the ethers to form complexes with the halides, those of the formula,

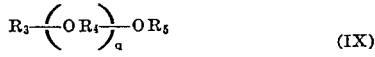

(IX)

in which $R_3$ is an alkyl or phenyl group of up to 10 carbons,
$R_4$ is an alkylene or phenylene groups of 2 to 4 carbons,
$g$ is zero, or an integer of 1 to 3, and
$R_5$ is an alkyl group of up to 10 carbons, are suitable Examples of useful ethers include monoethers such as diethyl ether dipropyl ether; diethers such as ethylene glycol dimethyl ether and ethylene glycol diethyl ether; triethers such as diethylene glycol dimethyl ether and diethylene glycol diethyl ether; and ethers containing aromatic hydrocarbon radical such as anisole. Obviously, ethers other than the above-named may be used, as far as their complexes with stannic halides are soluble in the solvent employed in the reaction. When ether-stannic halide complex sparingly soluble in the reaction solvent is formed, the reaction system becomes heterogeneous, and furthermore the complex will be precipitated as a mixture with the lactam complex formed, which renders the whole reaction meaningless.

The lactim-O-sulfonic acids of Formula VI employed in the invention can be formed by reaction of lactams with sulfur trioxide. When the reaction is performed in the concurrent presence of lactim-O-sulfonic acid and stannic halide, the acids may be formed by either causing sulfur trioxide to act on the lactam-stannic halide complex, or causing sulfur trioxide to act directly on the complex of alicyclic ketoxime and stannic halide. The latter reaction can be represented by the following reaction formula:

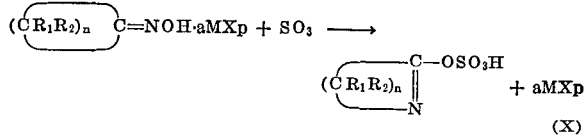

(X)

The lactam-stannic halide complex formed in this second step of the subject process is separated from the reaction mixture as solid, by the means known per se.

For example, alicyclic ketoxime-stannic halide complex is solid, and is sparingly soluble in afore-mentioned inert solvents. It is gradually dissolved, however, as its reaction with the lactim-O-sulfonic acid advances, and thereafter solid lactam-stannic halide complex is precipitated. Therefore, after termination of the reaction of the added alicyclic ketoxime-stannic halide complex, the precipitated, solid lactam-stannic halide complex is recovered. Whereas, if the lactam complex formed is soluble in the inert organic solvent, the reaction mixture is thrown into a solvent in which the complex is insoluble so that the complex may be recovered as precipitate.

Thus obtained lactam-stannic halide complex is recycled to the first step, to serve as the material of free lactam production.

The process of the invention may be better understood by referring to the attached drawing, which is a flow chart of the described process.

Referring to the drawing, a lactam-stannic halide complex is fed into the reactor 3 through a conduit 11, while a ketoxime is also introduced through a conduit 12. In the reactor thus free lactam and alicyclic ketoxime-stannic halide complex is formed. The reaction mixture is sent to an evaporator 4 through a conduit 13, and the solvent which served as the reaction medium is separated through a conduit 14. The reaction product remaining after the removal of solvent is sent to an extractor 5 through a conduit 15. Separately, the extraction solvent is fed into the extractor through a conduit 16. The liquid extraction mixture is introduced into a separator 6 through a conduit 17. The solvent phase is supplied into the solvent recovery column 7 through a conduit 18, and the solvent is recovered through a conduit 19, while the product lactam is obtained through a conduit 20 as the residue. Also the heavy component separated at the separator 6 contains alicyclic ketoxime-stannic halide complex, which is introduced into a rearrangement reactor 1, through conduits 21 and 8. Simultaneously, the reaction solvent is introduced into the same reactor through a conduit 22, to dilute the heavy component. The alicyclic ketoxime-stannic halide complex is rearranged into lactam-stannic halide complex in the presence of lactim-O-sulfonic acid, in said reactor 1. The rearrangement reaction mixture is sent into a separator 2 through a conduit 9, and whereby separated lactam-stannic halide complex is recycled into the first step. The rearrangement reaction solvent containing lactim-O-sulfonic acid is recovered through the conduit 10.

The following examples are illustrative of the present invention. It will be understood that the invention is not limited to these examples.

EXAMPLE 1

To a solution of 2.3 g. of cyclohexanone oxime in 50 ml. of ethylene chloride, 5.0 g. of ε-caprolactam-stannic chloride complex (hereinafter referred to as the lactam complex) was added, and the resulting suspension was heated under reflux for 10 minutes. Within several minutes after the refluxing started, the lactam complex was dissolved and the reaction mixture became a homogeneous solution. After the refluxing, ethylene chloride was recovered by distillation under reduced pressure, and to the remaining condensed syrup-like liquid 30 ml. of benzene was added. Thus formed solution was allowed to stand overnight. The precipitated product was a mixture of cyclohexanone oxime-stannic chloride complex (hereinafter referred to as oxime complex) and the lactam complex. The mixture weighed 4.8 g. and was found to contain 78% of the oxime complex.

The filtrate was condensed under reduced pressure, and after recovery of benzene, 2.6 g. of residue composed mainly of ε-caprolactam and cyclohexanone oxime was obtained. The ε-caprolactam content of the mixture was 78%.

For increasing the content of the oxime complex and decreasing that of lactam complex in the solid mixture, the mixture was treated as follows.

4.8 grams of the mixture was suspended in 50 ml. of ethylene chloride, and to which 1.2 g. of cyclohexanone oxime was added. The mixture was heated for 10 minutes under reflux, and then concentrated under reduced pressure, to recover the ethylene chloride. To the residue 50 ml. of benzene was added to extract the benzene-soluble component, and the solid was collected by filtration. The solid was the oxime complex containing a minor quantity of the lactam complex. The yield was 4.7 g. It was suspended in 50 ml. of acetone, and heated under reflux for 5 minutes. After allowing the system to cool off, the precipitate was collected by filtration, which was the oxime complex having a melting point of 190–191° C. The yield of the said complex was 4.3 g. The infrared absorption spectrum of the precipitate was essentially identical with that of the oxime complex directly synthesized from cyclohexanone oxime and stannic chloride as described in later-given Example 10.

EXAMPLE 2

2.27 grams of cyclohexanone oxime was dissolved in 50 ml. of anhydrous benzene, and to the solution 4.87 g. of ε-caprolactam-stannic chloride complex was added. The mixture was heated under reflux for 10 minutes. During the reaction, no conspicuous change in appearance was observed. The reaction mixture in the form of colorless suspension was cooled, and allowed to stand at room tempreature for 24 hours. Thus precipitated solid was collected by filtration to yield 4.7 g. (recovery ratio: 97%) of powdery solid which was a mixture of 74% of cyclohexanone oxime-stannic chloride complex and 26% of ε-caprolactam-stannic chloride complex. Separately, the filtrate separated from the solid mixture was concentrated. The residue weighed 2.5 g. and was found to consist mainly of ε-caprolactam and cyclohexanone oxime. This mixture contained 1.8 g. of ε-caprolactam. Thus the content ratio of oxime to lactam in the mixture was approximately 26:74.

EXAMPLE 3

2.3 grams of cyclohexanone oxime was mixed with 5.0 g. of ε-caprolactam-stannic chloride complex, and heated to 85–90° C. The mixture began to melt within several minutes, to become a substantially homogeneous mixed molten state after approximately 10 minutes' heating. The heating was continued for further 5 minutes, and the system was allowed to cool off. Then the mixture was dissolved in 30 ml. of benzene, and allowed to stand overnight at room temperature. Thus formed precipitate was collected by filtration. The precipitate was a mixture of the oxime complex and the lactam complex. The yield was 4.6 g. The mixture contained 76% of the oxime complex.

ε-caprolactam was recovered from the filtrate as follows:

To the filtrate, 100 ml. of ether was added, and the resulting oily lower layer was removed by decantation. The separated solution was concentrated under reduced pressure. The residue was a mixture of ε-caprolactam and cyclohexanone oxime and the yield as 2.2 g. The ε-caprolactam in the mixture was separated from the cyclohexanone oxime by aqueous extraction. Finally 1.6 g. of free ε-caprolactam was obtained by treating the aqueous ε-caprolactam solution with activated carbon, followed by extraction with chloroform.

EXAMPLE 4

To a suspension of 6.64 g. (20 mmols) of ε-caprolactam-stannic bromide complex in anhydrous benzene, 2.26 g. (20 mmols) of crystalline cyclohexanone oxime was added at room temperature. The suspended crystals immediately disappeared, and a light yellow solution was formed. The reaction mixture was stirred at room temperature, and a crystalline precipitate began to form 2 hours after the oxime addition. The mixture was allowed to stand for 48 hours at room temperature, and then the precipitate was separated by filtration. The precipitate was a mixture of the oxime complex and the lactam complex, and its yield was 5.45 g. The oxime complex content of the mixture was 95%, which corresponds to 78% of theoretical yield.

The filtrate was treated as follows to effect recovery of free ε-caprolactam.

The filtrate was concentrated to approximately 30 ml. under reduced pressure, and to which 100 ml. of ether was added. The resulting minor quantity of oily lower layer was separated by decantation and removed. Recovering ether and benzene from the upper layer, 1.6 g. of a mixture of ε-caprolactam and cyclohexanone oxime was obtained. The ε-caprolactam in the mixture was extracted with water to be separated from cyclohexanone oxime, and 1.47 g. of free ε-caprolactam was recovered from the aqueous solution by chloroform extraction.

EXAMPLE 5

2.5 grams of 4-methylcyclohexanone oxime was mixed with 5.2 g. of γ-methylcaprolactam-stannic chloride complex, in ethylene chloride similarly to Example 1. Through the subsequent treatments similar to those of Example 1, 4.9 g. of a precipitate which was a mixture of 4-methylcyclohexanone oxime-stannic chloride complex and γ-methylcaprolactam-stannic chloride complex, was obtained, and the content of the former complex was 75%.

The filtrate separated from the precipitate was concentrated under reduced pressure, and 2.9 g. of a mixture composed mainly of γ-methylcaprolactam and 4-methylcyclohexanone oxime was obtained, and the content of the former lactam was 62%.

The 4-methylcyclohexanone oxime-stannic chloride complex had a melting point of 161–163° C., and its infrared absorption spectrum was essentially identical with that of the oxime complex directly synthesized from 4-methylcyclohexanone oxime and stannic chloride as described in later-given Example 11.

EXAMPLE 6

(The first step)

To 150 ml. of ethylene chloride containing 11.3 g. (100 mmols) of cyclohexanone oxime, 24.3 g. (100 mmols) of ε-caprolactam-stannic chloride complex was added, and the mixture was heated under reflux. The suspended lactam complex was dissolved within several minutes, and a homogeneous solution was formed. After 20 minutes' heating under reflux, ethylene chloride was removed by distillation under reduced pressure. The syrup-like residue was dissolved in 130 ml. of benzene, and allowed to stand overnight at room temperature. Then the mixture was filtrated to separate the formed precipitate. The precipitate was a mixture of the oxime complex and the lactam complex. The yield was 23.8 g., and the oxime complex content of the mixture was 78%.

The filtrate was concentrated under reduced pressure to recover benzene, and 12.4 g. of the residue containing mainly ε-caprolactam and cyclohexanone oxime was obtained. In the mixture ε-caprolactam was contained in an amount of 9.4 g. (83.2 mmols).

(The second step)

To 70 ml. of ethylene chloride containing 48 mmols of ε-caprolactim-O-sulfonic acid, 23.8 g. of the oxime complex containing 22% of the lactam complex obtained in the first step was added in dry nitrogen gas atmosphere at room temperature. Soon after stirring was started, the temperature rose by 2–3° C. above room temperature, and became constant at around 29° C. The stirring was continued for 10 hours without external heating, and the formed powdery solid was collected by filtration. The solid was the lactam complex, and the yield was 21.4 g. (87.9 mmol), corresponding to a recovery ratio of 90%. The lactam complex can be recycled to the first step to form free lactam.

The filtrate separated from the solid lactam complex contained ε-caprolactim-O-sulfonic acid and the residual lactam complex, and could be repetitively used for the reaction of this second step.

EXAMPLE 7

(The first step)

To 300 ml. of ethylene chloride containing 20.9 g. (185 mmols) of cyclohexanone oxime, 45 g. of ε-caprolactam-stannic chloride complex (185 mmols) was added, and heated under reflux. The suspended lactam complex was dissolved within several minutes, forming a homogeneous solution. After 30 minutes' heating under reflux, ethylene chloride was recovered by distillation under reduced pressure. The syrup-like distillation residue was dissolved in 200 ml. of benzene, and allowed to stand overnight at room temperature to cause precipitation of solid. Thus precipitated product was collected by filtration. The precipitate was a mixture of cyclohexanone oxime-stannic chloride complex and the lactam complex. The yield was 44 g.

The filtrate was concentrated under reduced pressure and benzene was recovered, whereby 21.2 g. of concentration residue containing as the main components ε-caprolactam and cyclohexanone oxime was obtained. The residue had contained 16.6 g. (147 mmols) of ε-caprolactam. Therefore, the molar ratio of the oxime to the lactam in the concentration residue was approximately 22:78.

(The second step)

A solution of 48 mmols of ε-caprolactim-O-sulfonic acid and 24 mmols of stannic chloride in 100 ml. of ethylene chloride was once heated to 65° C., and when the solution temperature reached 60° C., 11 g. of the cyclohexanone oxime-stannic chloride complex containing ε-caprolactam-stannic chloride complex obtained in the above first step was added to the solution. Immediately after the addition the complexes were dissolved, and the temperature of reaction mixture rose, at the highest, to 76.5° C. Then the temperature began to fall, and reached 60° C. in 7 minutes after the addition of complexes. The system was maintained at 60° C. for 3 minutes by heating, so as to effect ten minutes' reaction in total at temperatures not lower than 60° C. Then to the reaction mixture further 11 g. of the complexes were added, and then treated in a manner similar to that followed the first addition. The highest temperatures reached by the exothermic reaction performed upon addition of the complexes were, respectively, 73° C. at the second addition, 71° C. at the third addition, and 69° C. at the fourth addition. Four hours after the fourth addition of the oxime complex, 5.4 g. (48 mmols) of ε-caprolactam was added to the system, and the mixture was stirred for 8 hours and allowed to stand overnight. The precipitated crystals were collected by filtration, whereby 49.3 g. (corres. to an yield of 89%) of ε-caprolactam-stannic chloride complex was obtained. This complex can be recycled to the first step to form free ε-caprolactam.

The filtrate remaining after the recovery of above lactam complex contained ε-caprolactam-O-sulfonic acid and the residual lactam complex, can be repetitively used for the reaction of the second step upon addition of 24 mmols of stannic chloride.

EXAMPLE 8

(The first step)

To 300 ml. of anhydrous benzene containing 22.7 g. (200 mmols) of cyclohexanone oxime, 48.7 g. (200 mmols) of ε-caprolactam-stannic chloride complex was added, and heated under reflux for 30 minutes. The reaction mixture in the form of a colorless suspension which showed no appreciable change in appearance during the heating was cooled, and allowed to stand for 24 hours at room temperature. The precipitate formed was collected by filtration. 47.5 g. (recovery ratio: 98%) of powdery solid was obtained. The oxime complex content of the solid mixture was 74%.

The filtrate was concentrated under reduced pressure in order to effect separation and recovery of benzene, and 24.2 g. of a mixture composed mainly of ε-caprolactam and cyclohexanone oxime was obtained as the concentration residue. The residue contained 17.9 g. (158 mmols) of ε-caprolactam. Therefore, the molar ratio of the oxime to the lactam in the residue was approximately 26:74.

(The second step)

To a solution of ε-caprolactim-O-sulfonic acid (48 mmols), stannic chloride (24 mmols) and ethylene glycol dimethyl ether (14 mmols) in 100 ml. of ethylene chloride, 47.5 g. of a mixture composed of 26% of ε-caprolactam-stannic chloride complex and 74% of cyclohexanone oxime-stannic chloride complex, obtained in the above first step, was added at 60° C., in four portions, at the intervals of 10 minutes, similarly to the practice in second step of Example 7. After each addition of the complexes, exothermic phenomenon was observed. The highest temperatures were, respectively, 77° C. after the first addition, 73° C. after the second addition, 72° C. after the third addition, and 71° C. after the fourth addition. After the fourth addition of the complexes, the reaction mixture was stirred for 3 hours at room temperature, and then cooled with stirring, and the stirring was continued further for 30 minutes at a temperature not higher than 10° C. The precipitate thus formed was collected by filtration, whereby 41.9 g. of ε-caprolactam-stannic chloride complex was obtained. The yield was 88%. This lactam complex could be recycled into the first step to form free lactam.

The filtrate separated from the lactam complex contained ε-caprolactim-O-sulfonic acid, stannic chloride, ethylene glycol dimethyl ether, and residual lactam complex, which can be repetitively used for the reaction in the second step.

EXAMPLE 9

(The first step)

The reaction of 22.7 g. (200 mmols) of cyclohexanone oxime with 48.7 g. (200 mmols) of ε-caprolactam-stannic chloride complex was performed in an identical manner with the first step of Example 8, and a mixture of 16.9 g. of ε-caprolactam and 5.9 g. of cyclohexanone oxime, as well as 47 g. (97%) of cyclohexanone oxime-stannic chloride complex containing 26% of ε-caprolactam-stannic chloride complex were obtained.

(The second step)

To a solution of ε-caprolactim-O-sulfonic acid (48 mmols) and stannic chloride (24 mmols) in 100 ml. of ethylene chloride, the mixture of ε-caprolactam-stannic chloride complex with cyclohexanone oxime stannic chloride complex obtained in the above first step was added at 60° C., in four portions. A first 11.75 g. portion of the complexes were added, whereupon the temperature of reaction mixture reached at the highest 76.5° C. due to the exothermic reaction. Soon, the temperature started to fall, and therefore it was maintained at 60° C. or above by heating, for 10 minutes. Subsequently a second 11.75 g. portion of the complex mixture was added, and the resultant mixture was treated in a manner similar to that followed the first addition. Third and fourth portions were then added, and the same procedure repeated each time. The highest temperatures reached upon addition of the complexes due to the exothermic reaction were, respectively, 72.5° C. after the second addition, 72.2° C. after the third addition, and 71° C. after the fourth addition. After ten minutes' reaction at 60° C. or above following the fourth addition, the system was heated under reflux for 30 minutes, stirred for 8 hours at room temperature and allowed to stand overnight. The resulting precipitate was collected by filtration. Thus 38.05 g. of ε-caprolactam-stannic chloride complex was obtained. This corresponds to 82% of the theoretical yield, i.e., 47 g. This lactam complex can be recycled to the first step to form free lactam.

The filtrate separated from the lactam complex contained ε-caprolactim-O-sulfonic acid, stannic chloride, and residual lactam complex, which can be repetitively used in the reaction of the second step.

EXAMPLE 10

To a solution of 11.3 g. (100 mmols) of cyclohexanone oxime in 50 ml. of ethylene chloride, a solution of 13.0 g. (50 mmols) of stannic chloride in 20 ml. of ethylene chloride was gradually added with stirring. In the meantime, the reaction liquid was externally cooled to be maintained at a temperature not higher than 10° C. Soon after the addition had been completed, colorless precipitate began to form. After one night's standing at room temperature, the colorless precipitate was collected by filtration. The yield of the precipitate was 23.7 g. The elemental analytical values were as follows: N, 5.93%; C, 29.60%; and H, 4.47%. The melting point was 190.5–191° C. The analytical values coincided well with the theoretical values of a complex of cyclohexanone oxime and stannic chloride in a molar ratio of 2:1

which are N, 5.75%; C, 29.57%, and H, 4.52%. The yield was 97%.

EXAMPLE 11

38.1 grams of 4-methylcyclohexanone oxime (300 mmols) was treated with 39.2 g. of stannic chloride (150 mmols) similarly to Example 10. Thus 65.7 g. of a colorless precipitate was obtained. The elemental analytical values of the precipitate were: N, 5.46%; C, 32.8% and H, 4.93%. The melting point was 161–163° C. The analytical values coincided very well with those of a complex of 4-methylcyclohexanone oxime and stannic chloride in a molar ratio of 2:1

$(C_{14}H_{26}N_2O_2 \cdot SnCl_4)$ which are N, 5.45%; C, 32.68% and H, 5.06%. The yield was 85%.

We claim:

1. A process for the preparation of lactams, which comprises reacting a lactam-stannic halide complex of the formula

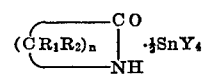

wherein $n$ is a number of 3 to 11, each of $R_1$ and $R_2$ is a hydrogen atom, or an alkyl or alkenyl group, and X is a halogen atom, with an alicyclic ketoxime of the formula

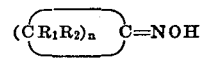

wherein $n$ is a number of 3 to 11, and each of $R_1$ and $R_2$ is a hydrogen atom, or an alkyl or alkenyl group, at a temperature ranging from about 20° C. to about 150° C. to form a lactam of the formula

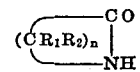

wherein $n$, $R_1$ and $R_2$ are as defined above, and an alicyclic ketoxime-stannic halide complex of the formula

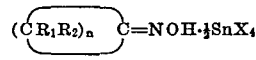

wherein $n$, $R_1$, $R_2$ and X are as defined above, and recovering said lactam.

2. The process of claim 1 wherein said lactam-stannic halide complex and said alicyclic ketoxime are reacted in substantially equimolar quantities.

3. The process of claim 1 wherein said lactam-stannic halide complex is caprolactam-stannic chloride complex.

4. The process of claim 1 wherein said alicyclic ketoxime is cyclohexanone oxime.

5. The process of claim 1 wherein the reaction is performed in an inert organic solvent at a temperature ranging from about 60° C. to about 100° C.

6. The process of claim 1 wherein the reaction is performed in the absence of any solvent, while maintaining the alicyclic ketoxime in the molten state.

7. A process for the preparation of lactams, which comprises:

(1) treating a ketoxime (a) of the formula

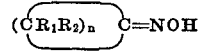

in which $n$ is a number of 3 to 11, and each of $R_1$ and $R_2$ is a hydrogen atom, or an alkyl or alkenyl group, with a lactam-stannic halide complex (b) of the formula

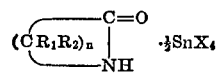

in which $n$, $R_1$ and $R_2$ have the above-defined significations, and X is a halogen atom,
at a temperature ranging from about 20° C. to about 150° C. to form corresponding free lactam (c) and complex (d) of above ketoxime with stannic halide, (2) recovering the formed lactam (c) as the product, (3) adding the isolated ketoxime-stannic halide complex (d) to a reaction system of an inert organic solvent containing a lactam-O-sulfonic acid (e) of the formula

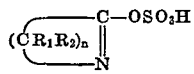

wherein $n$ is a number of 3 to 11, and each of $R_1$ and $R_2$ is a hydrogen atom, or an alkyl or alkenyl group,
in such a quantity that the complex (d) does not exceed 500 mol percent based on the lactim-O-sulfonic acid (e) in the reaction system at temperatures ranging from 20 to 80° C., and (4) recycling the thus formed lactam-stannic halide complex (b) to the foregoing step (1).

8. The process of claim 7 wherein in the step (3), a stannic halide or a complex thereof with an ether is present in the reaction system in an amount up to the amount equimolar to said lactim-O-sulfonic acid initially present in the reaction system.

References Cited
UNITED STATES PATENTS
3,090,739   5/1963   Ito _____ 260—239.3 A
3,114,748   12/1963  Bigot et al. _____ 260—239.3 A

OTHER REFERENCES
Organic Reactions, vol. 11, pp. 2–14 (Wiley) (1960).

HENRY R. JILES, Primary Examiner

R. T. BOND, Assistant Examiner

U.S. Cl. X.R.

260—239.3 R, 393.86 326.5 FN, 299, 270

UNITED STATES PATENT OFFICE
CERTIFICATE OF CORRECTION

Patent No. 3,700,656          Dated October 24, 1972

Inventor(s) MITSUO MASAKI ET AL

It is certified that error appears in the above-identified patent and that said Letters Patent are hereby corrected as shown below:

Delete the first formula in Claim 1 and insert

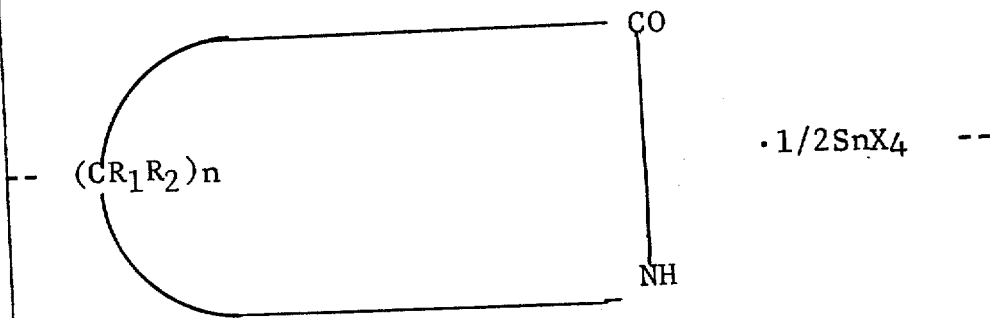

Signed and sealed this 8th day of May 1973.

(SEAL)
Attest:

EDWARD M.FLETCHER,JR.
Attesting Officer

ROBERT GOTTSCHALK
Commissioner of Patents